United States Patent Office 3,561,201
Patented Feb. 9, 1971

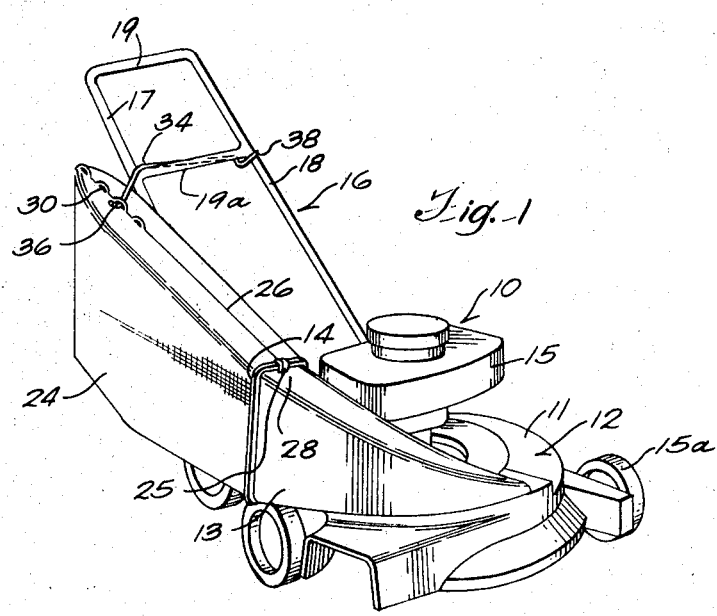
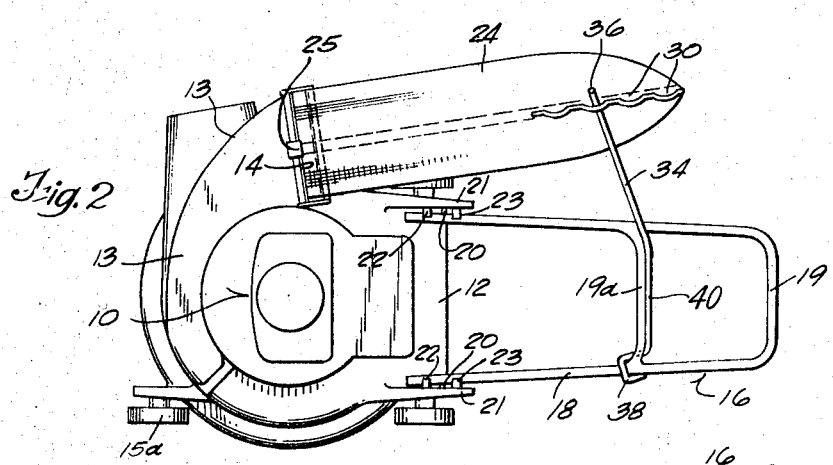
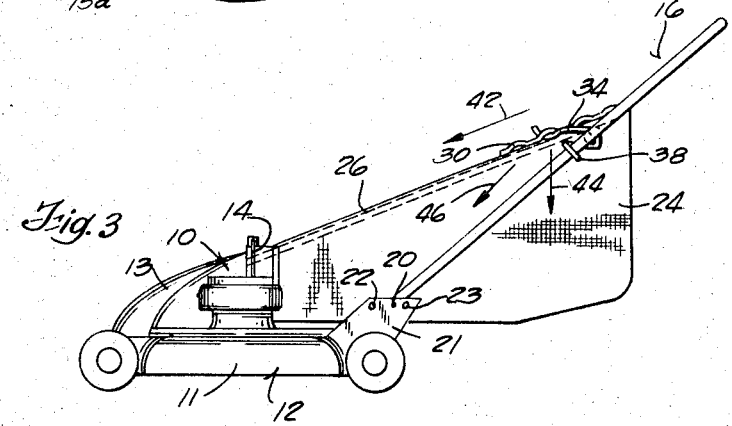

3,561,201
GRASS BAG CARRIER FOR LAWNMOWER
Einar S. Dahl, Galesburg, Ill., assignor to Outboard Marine Corporation, Waukegan, Ill., a corporation of Delaware
Filed Nov. 4, 1968, Ser. No. 773,109
Int. Cl. A01d 35/22, 53/06
U.S. Cl. 56—202                                8 Claims

ABSTRACT OF THE DISCLOSURE

Disclosed herein is a rotary mower provided with a grass clipping collection bag which is supported at the forward end by the mower housing and supported adjacent the rear end by an arm which is connected to a mower handle to form an acute angle between the upper edge of the bag and the handle. The supporting arm has a hook which is selectively engageable with a series of loops on a reinforced upper edge of the bag to maintain the edge taut to create a force component on the connection between the bag and handle along the upper edge of the bag. When the grass collection bag fills with clippings, the forward force component creates a resultant force on the handle because of connection between the mower handle and the bag, which force extends in a direction toward or forwardly of the pivotal connection of the handle to balance the downward forces on the handle.

BACKGROUND OF INVENTION

The invention relates to rotary lawnmowers and more particularly to rotary lawnmowers having bags for catching grass clippings and debris and free floating handles pivotally connected to the mower housing and movable between forward and rear stops. When collection bags have been supported in prior arrangements between the free floating handle and the blade housing, a downward force is exerted on the handle as the grass bag fills with clippings. The added load caused by accumulation of clippings can be tiring to the mower operator if the operator uses the handle in its free floating position between the forward and rear stops.

SUMMARY OF INVENTION

To eliminate undesirable downward forces on the handle of a lawnmower, the invention provides an arrangement for supporting the grass clipping collection bag between the mower housing and the mower handle and for maintaining the upper edge of the collection bag taut so that the loading of the bag by accumulated grass clippings and debris stresses the upper margin or edge of the bag and creates a resultant force in a direction toward or forwardly of the pivotal connection between the mower handle and housing deck. Thus, the mower operator does not sense a greatly increased downward force on the handle when the collection bag is full as compared to when the bag is empty.

More specifically, the collection bag is connected to the mower housing so that the upper edge of the bag is taut and forms and acute angle with a plane extending through the handle and the pivotal connection between the handle and the mower deck with the upper edge of the bag forming the upper leg of the angle. When clippings accumulate in the bag, a resultant force is exerted on the connection between the handle and the bag in a direction or plane which extends through or forwardly of the pivotal connection of the handle to the inner deck. A sufficient acute angle to obtain a resultant force component in the desired direction is achieved by connecting the upper edge of the bag to the upper edge of the mower discharge chute. The pivotal connection between the handle and mower deck is desirably lower than the connection between the upper edge of the bag and the chute and also adjacent the rear of the mower deck.

The connection between the upper edge of the collection bag and the handle is provided by an arm which has a terminal hook which is selectively engageable with any one of a series of loops in the upper edge of the bag. The other end of the arm is connected to the mower handle. The loops afford adjustment of the connection between the arm and the bag so as to maintain the upper edge of the bag in a taut condition to provide a force component along the upper edge of the bag.

To prevent the bag from stretching, the bag is reinforced by a strip which is sewn into the upper edge of the bag.

Further objects and advantages of the invention will become apparent from the following description and accompanying drawings.

DRAWINGS

FIG. 1 is a perspective view of a rotary lawnmower embodying the invention.

FIG. 2 is a plan view of the lawnmower shown in FIG. 1.

FIG. 3 is a side elevational view of the lawnmower shown in FIG. 1.

DETAILED DESCRIPTION

In the drawings, FIG. 1 shows a rotary mower which is generally designated 10 and which includes a blade housing 11 having a grass clipping discharge chute 13 with an outlet 14. The deck 12 carries an engine 15. The housing 11 is supported for travel in adjacent relation to the ground by wheels 15A.

The mower 10 is guided by a handle 16 formed from two legs 17 and 18 which are interconnected by cross members 19 and 19A. The handle is pivotally connected at 20 to upstanding ears 21 at the rear of deck 12 and is movable between two stops 22 and 23 located on the ears 21. The handle normally rests on the rear stop 23 when the mower is not in use. When the mower is in use, the handle can be utilized in a floating position between the two stops 22 and 23.

The mower 10 is provided with a grass clipping collection bag 24 having, at its forward end, a mouth 25 which communicates with the outlet 14 of the grass clipping discharge chute. The bag has an upper edge 26.

In accordance with the invention means are provided for connecting the upper edge 26 of the bag to the housing 11 or chute 13, and to the handle 16 so as to cause the upper edge of the bag to be maintained in a taut condition and at an acute angle with a plane extending through the handle and the pivotal connection 20 of the handle with the mower deck 12.

In the disclosed construction the means connecting the upper edge of the bag 24 to the housing 11 comprises a clamp 25 which is on the discharge chute 13 and which secures the upper edge 26 of the bag to the upper edge 28 of the mower discharge chute.

The means connecting the upper edge of the bag to the handle 16 comprises a longitudinally extending row of a series of loops 30 secured to the upper edge 26. The loops 30 can be formed from a piece of nonstretchable tape, such as nylon or other synthetic material, sewn or otherwise secured to the bag. The means connecting the upper edge of the handle to the bag also includes an arm 34 having, at one end, a hook 36 which is selectively engageable with the loops 30. The arm is connected to the handle 16 by a hook 38 which is located at the other end of the arm and which extends around the cross member 19A and forwardly around the leg 18 to capture the leg 18 and secure the portion 40 of the arm 34 in engagement with the cross member 19A. In the alternative, the arm 34 can be bolted or otherwise secured to the handle 16.

In operation of the mower 10, and as the grass clipping bag 24 accumulates clippings, forces are exerted on the connection between the hook 36 and the upper edge of the bag as represented by vectors 42 and 44 in FIG. 3. Vectors 42 and 44 create a resultant force as represented by vector 46 which is in a direction or plane which extends through or forwardly of the pivotal connection between the handle 16 and the mower deck 12. Thus, the mower operator does not experience any materially heavier load when the bag is filled than when it is empty.

To obtain a resultant force which either intersects or extends forwardly of the pivotal connection between the handle 16 and the mower deck 12 there must be an acute angle between the upper edge of the bag and a plane through the handle and pivotal connection, with the upper edge of the bag forming the upper leg of the acute angle. In the disclosed construction a sufficient acute angle is achieved by connecting the upper edge of the bag to the upper edge of the discharge chute, and placing the pivotal connection between the handle and mower deck at the rearwardmost portion of the deck 11. In the alternative, the desired acute angle can be obtained by connecting the upper edge 26 of the bag 24 at the forewardmost portion of the mower deck.

The location of the connection of the upper edge of the bag to the mower handle and the connection between the handle and the mower deck and the connection between the upper edge of the bag and the mower housing to obtain the desired resultant forces to minimize loading on the handle can also be defined by the relationship of planes extending through the various connections and the angles between the planes.

A first plane extending through or along the upper edge of the bag 24 forms an acute angle with a second plane extending through or along said handle through the connection of the handle 16 and the housing 11. The first plane also forms an acute angle with a third plane extending through the connection between the handle 16 and the mower housing 11 and through the connection between the bag 24 and the housing 11. The first, second and third planes form a triangle in which the angle between the second and third planes is greater than the sum of the angles formed by intersection of the first and second planes and by interesection of the first and third planes. The vector of the desired resultant force is located within the triangle formed by the planes.

Various of the features of the invention are set forth in the following claims.

I claim:

1. A lawnmower comprising a blade housing, said housing including a grass clipping discharge outlet, a handle pivotally connected to said housing, a grass clipping collection bag having an upper edge and a mouth in communication with said outlet, and means connecting the upper edge of said bag to said handle and to said housing so that a plane through the connections of said upper edge of said bag to said housing and said handle overlies and is at an acute angle with a plane extending through the connections of said handle to said bag and said housing.

2. The lawnmower of claim 1 wherein said pivotal connection between said handle and said housing is spaced adjacent from the rear of said housing and said connection between the upper edge of said bag and said housing is adjacent the forward portion of said housing.

3. The lawnmower of claim 1 wherein said housing has a deck and said pivotal connection between said handle and said housing is on said deck and said connection between said upper edge of said bag and said housing is above said deck.

4. A lawnmower comprising a blade housing, said blade housing including a housing deck, a mower handle pivotally connected to said deck, a grass clipping collection bag, means connecting the upper edge of said bag to said handle and to said housing, said connections between said handle and said bag and said bag and said housing being located with respect to the connection between said handle and said deck so that a first plane extending through the upper edge of said bag forms an acute angle with a second plane extending through said handle and the connection between said handle and said housing and wherein said first plane forms an acute angle with a third plane extending through the connection between said handle and said deck and through the connection between said bag and said housing, said first, second and third planes forming a triangle with the angle formed between the second and third planes being greater than the sum of the angles formed by intersection of the first and second planes and by intersection of the first and third planes.

5. A lawnmower in accordance with claim 4 wherein the third plane extends upwardly and forwardly from the connection of said handle with said deck.

6. An lawnmower in accordance with claim 4 wherein upon accumulation of clippings in said bag a first force vector is exerted in a forward direction in the first plane from the connection between said bag and said handle and a second force vector is exerted vertically downwardly from the connection between said bag and said handle and a resultant force is exerted from said connection between said handle and said bag in a forward direction which falls within said triangle.

7. A lawnmower in accordance with claim 1 wherein said grass clipping collection bag includes, along the upper edge thereof, a strengthening member.

8. A lawnmower in accordance with claim 1 including means including forward and rearward stops on said housing for limiting pivotal movement of said handle and wherein said plane through the connections of said upper edge of said bag to said housing and to said handle overlies and is at an acute angle with the plane extending through the connection of said handle to said bag and said housing when said handle is against said rearward stop.

References Cited

UNITED STATES PATENTS

| | | | |
|---|---|---|---|
| 2,970,422 | 2/1961 | Kroll et al. | 56—202 |
| 2,973,614 | 3/1961 | Horner et al. | 56—25.4 |
| 3,132,457 | 5/1964 | Slemmons | 56—202 |

RUSSELL R. KINSEY, Primary Examiner